No. 897,339. PATENTED SEPT. 1, 1908.
E. D. C. BAYNE & L. A. SUBERS.
AUTOMATIC MACHINE FOR WINDING FIRE HOSE PIPE
AND ANALOGOUS TUBING.
APPLICATION FILED JAN. 21, 1907. RENEWED JAN. 25, 1908.
4 SHEETS—SHEET 1.
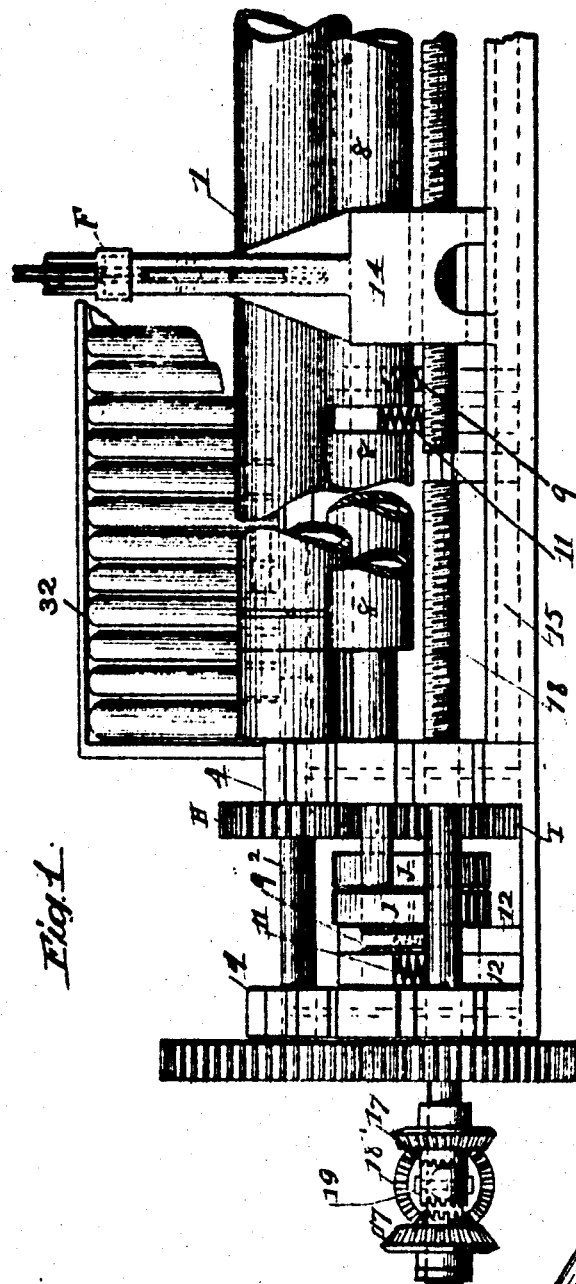

No. 897,339. PATENTED SEPT. 1, 1908.
E. D. C. BAYNE & L. A. SUBERS.
AUTOMATIC MACHINE FOR WINDING FIRE HOSE PIPE
AND ANALOGOUS TUBING.
APPLICATION FILED JAN. 21, 1907. RENEWED JAN. 25, 1908.
4 SHEETS—SHEET 2.
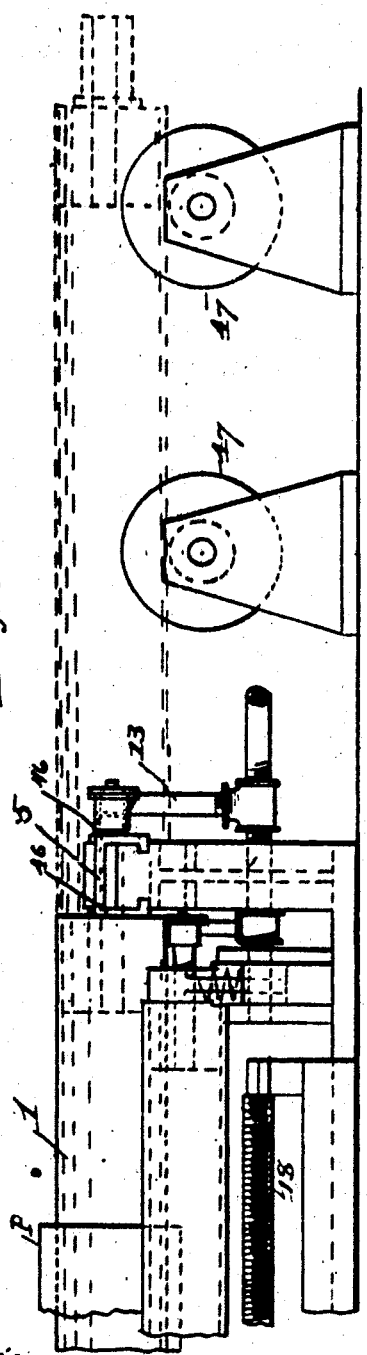
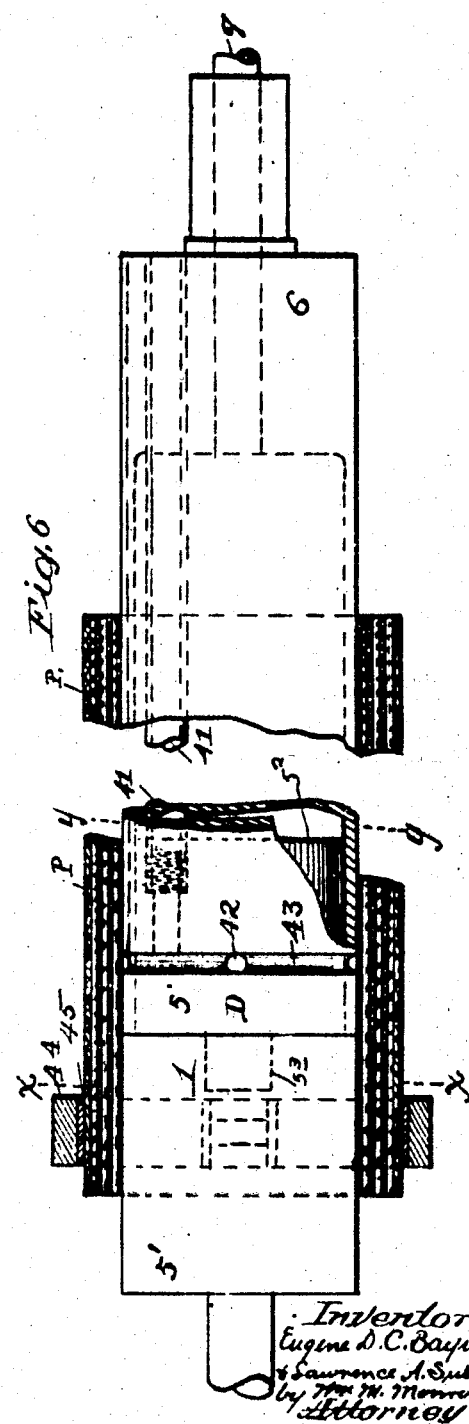
Witnesses
Inventors
Eugene D. C. Bayne
Lawrence A. Subers
Attorney No. 897,339. PATENTED SEPT. 1, 1908.
E. D. C. BAYNE & L. A. SUBERS.
AUTOMATIC MACHINE FOR WINDING FIRE HOSE PIPE
AND ANALOGOUS TUBING.
APPLICATION FILED JAN. 21, 1907. RENEWED JAN. 25, 1908.
4 SHEETS—SHEET 3.
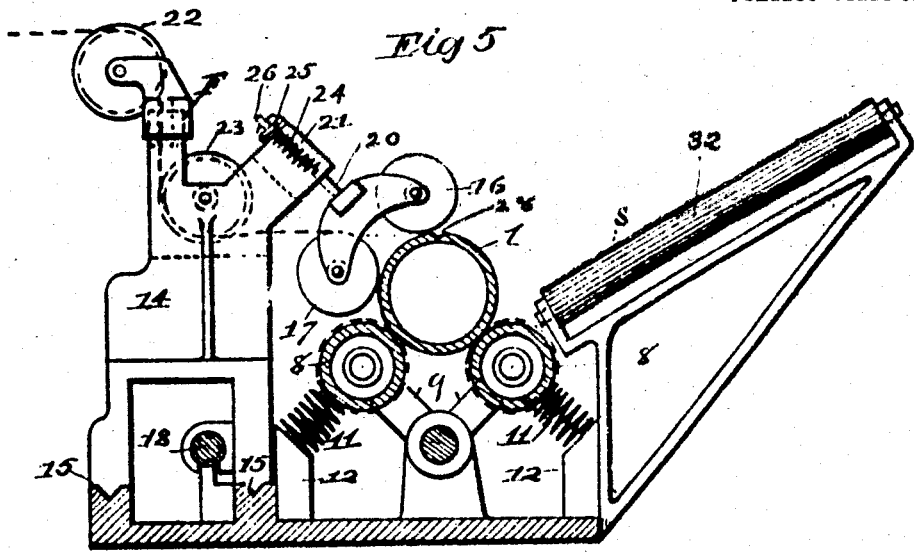
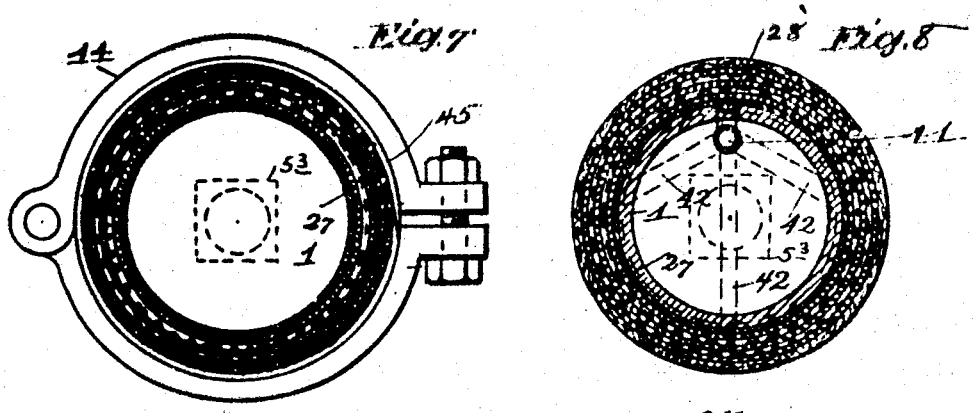
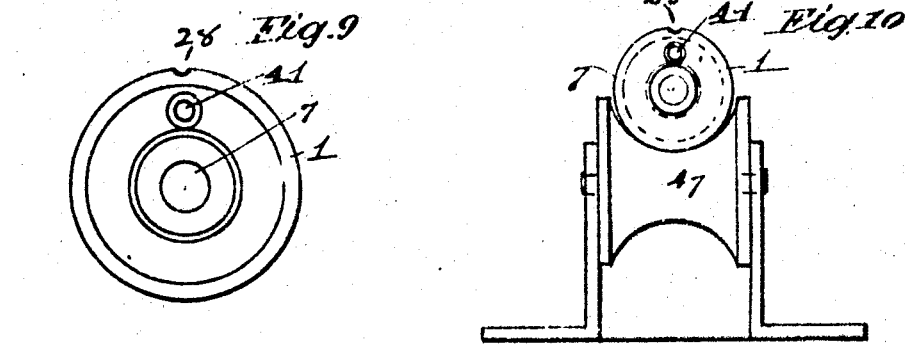

No. 897,339. PATENTED SEPT. 1, 1908.
E. D. C. BAYNE & L. A. SUBERS.
AUTOMATIC MACHINE FOR WINDING FIRE HOSE PIPE
AND ANALOGOUS TUBING.
APPLICATION FILED JAN. 21, 1907. RENEWED JAN. 25, 1908.
4 SHEETS—SHEET 4.
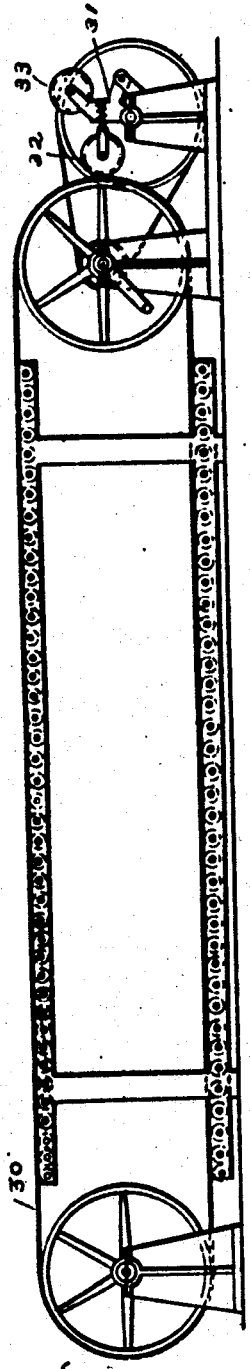
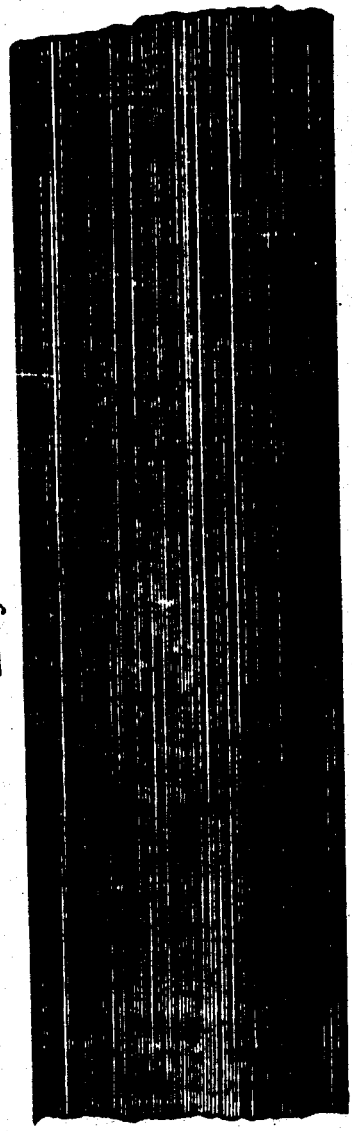

UNITED STATES PATENT OFFICE.

EUGENE D. C. BAYNE AND LAWRENCE A. SUBERS, OF CLEVELAND, OHIO.

AUTOMATIC MACHINE FOR WINDING FIRE-HOSE PIPE AND ANALOGOUS TUBING.

No. 897,339.     Specification of Letters Patent.     Patented Sept. 1, 1908.

Application filed January 21, 1907, Serial No. 353,352. Renewed January 25, 1908. Serial No. 412,636.

*To all whom it may concern:*

Be it known that we, EUGENE D. C. BAYNE and LAWRENCE A. SUBERS, citizens of the United States, and residents of Cleveland, county of Cuyahoga, State of Ohio, have invented certain new and useful Improvements in Automatic Machines for Winding Fire-Hose Pipe and Analogous Tubing, of which we hereby declare the following to be a full, clear, and exact description, such as will enable others skilled in the art to which it appertains to make and use the same.

Our invention relates to an automatically operating machine for winding a fire hose pipe, or analogous tubing, such as is described in our application, Ser. No. 347,839 filed December 14th, 1906, and in which the fire hose pipe or tubing is described as composed of alternating layers of longitudinally and transversely, circumferentially or spirally laid threads. In this fire hose pipe or tubing such thread is inclosed within an insulation of rubber, cylindrically shaped and having a sticky surface, whereby the threads in each layer adhere together and the separate layers adhere together and form a compact fire hose pipe or tubing which is afterwards fixed in shape by vulcanization.

The invention comprises a rotating, highly-polished, metallic tube upon which the circumferential or spiral layers are wound under pressure, an adjacent device for facilitating the application of the longitudinal layers in separate sheets, under pressure thereto, director wheels whereby each insulated thread is applied in its precise position to form the circumferential or spiral wind, and a screw threaded feed device to give the requisite pitch of wind to the thread so as to lay the insulated threads smoothly and closely together throughout the length of the fire hose pipe or tubing. In manufacturing the fire hose pipe or tubing with this device a predetermined length of pipe is manufactured at one time which can be conveniently handled, such as 50 feet, and the highly-polished, metallic winding tube and feed movements are made of a length to correspond therewith.

The invention further includes automatic devices for giving support and pressure to the fire hose pipe or tubing as the several layers are applied thereto, and for facilitating the removal of the finished fire hose pipe or tubing and for permitting the application of heat thereto for the purpose of vulcanizing the same.

It also includes the various details of construction and combination and arrangement of parts, as are hereinafter described, shown in the accompanying drawings and specifically pointed out in the claims.

In the accompanying drawings, Figure 1 is a side elevation of the inner end of the complete device, showing the main highly-polished, metallic winding tube and the highly-polished, metallic supporting tubes therefor, the frame which supports the director and guide wheels which apply the insulated thread to the highly-polished, metallic winding tube, and the feed screw therefor; Fig. 2 is a similar elevation showing the outer end thereof into which the steam heating pipes for vulcanizing the finished fire hose pipe or tubing are inserted and also the air pipe by means of which air is forced underneath the fire hose pipe or tubing to release it from the highly-polished, metallic winding tube. In this view the rollers are also shown which support the highly-polished, metallic winding tube as the finished fire hose pipe or tubing is retained in place while the highly-polished, metallic winding tube is released from the finished fire hose pipe or tubing and is withdrawn from the same; Fig. 3 is an end elevation of the machine showing the operating gears therefor and the inclined table composed of rollers upon which the sheet of longitudinally disposed threads forming the inner and intermediate layers of the fire hose pipe or tubing is laid; Fig. 4 is an elevation of the machine frame; Fig. 5 is a transverse section of the machine showing the manner of applying the thread to the highly-polished metallic winding tube and the relative position of the supporting highly-polished, metallic pressure tubes; Fig. 6 is a longitudinal section of the fire hose pipe or tubing in position upon the highly-polished, metallic winding tube, a portion of the winding tube being broken away; Fig. 7 is a transverse section on line *x—x* Fig. 6 showing the clamping ring; Fig. 8 is a similar section on line *y—y* Fig. 6 showing the air circulating tubes; Fig. 9 is an end elevation thereof; and Fig. 10 is an end elevation showing position upon one of the concave rollers, which receives the highly-polished, metallic winding tube when withdrawn from the finished fire hose pipe or tubing; Fig. 11 is a side elevation of the device upon which the longitudinally disposed layer of threads is formed before removing to the adjustable inclined roller table; Fig. 12 is a plan view of a portion of the sheet of longitudinally disposed insulated threads; Fig. 13 is a detail view of a portion of one of the insulated threads from which the fabric described is composed.

In these views, 1 is a highly-polished, metallic winding tube mounted upon terminal shafts 2 and 3 and upon the fixed bearings 4 at the inner end and removable bearings 5 at the outer end. This highly-polished, metallic tube is provided with solid end portions 5' and 6, Fig. 6 to which the shafts are secured and which serve to retain steam injected through the terminal pipe 7 to heat the fire hose pipe or tubing wrapped longitudinally, transversely, circumferentially or spirally upon the highly-polished, metallic tube to the vulcanizing point. The head of the highly-polished, metallic winding tube is provided with the air tube 41 and openings 42 diverging therefrom, an annular groove 43 in this head permits of the application of compressed air to all points of the surface of the highly polished winding tube so as to separate the finished fabric therefrom. From the inner solid end portion the highly-polished, metallic winding tube is detachable for the purpose of withdrawing the winding tube when the tubular fabric constructed thereon is completed. The winding tube 1 is slipped over a reduced portion 6² of this end, and the solid end 5' is divided at D and has a squared projection 5³ entering a corresponding opening in the face of the other portion.

On each side of this highly-polished, metallic winding tube, Fig. 1 are shown the supporting highly-polished, metallic tubes 8 which are mounted on swinging arms 9, pivoted on a common shaft 10 and provided with spring pressure by means of springs 11 at frequent intervals bearing upon stationary supports 12. Owing to the length of the highly-polished, metallic winding tube required to produce fire hose pipe or other tubing of considerable length such as 50 feet, these supporting highly-polished, metallic tubes are required to maintain the perfect alinement of the highly-polished, metallic winding tube, so that the fabric produced thereon will be perfectly straight. A further function of each of the side highly-polished, metallic supporting tubes is to provide a pressure upon the insulated threads as they are applied in layers to the highly-polished, metallic winding tube and to the several layers of insulated threads thereon, to compact the fabric and cause the layers to adhere together and it will be observed that the spring-pressed bearings 9 for the highly-polished, metallic supporting and pressure tubes are alternated in position so that no portion of the surface of the fire hose pipe or tubing will be left without pressure. Steam is admitted through steam pipes 13 with swivel joint at the outer extremities of the highly-polished, metallic winding tube and highly-polished, metallic pressure tubes, by means of which all the highly-polished, metallic tubes are heated so as to apply sufficient heat to the completed fire hose pipe or tubing to vulcanize it. These highly polished metallic pressure tubes are rotated by means of gears, H and I, and belts J passing over pulleys K.

At one side of the highly-polished, metallic winding tube is shown a traveling carriage 14 mounted upon longitudinal guides 15 upon which are swiveled the director wheels 16 and 17 by means of which the insulated thread is applied to the highly-polished, metallic winding tube to form the circumferential or spiral wind. A longitudinal screw 18 operates this carriage to traverse the entire length of the highly polished, metallic winding tube. This screw is connected in its movement with one shaft of the highly-polished, metallic winding tube so that the movements of the highly-polished, metallic tubes and screw are correlative to so feed the carriage as to lay the insulated thread in a close circumferential or spiral wind upon the winding tube 1 with the sticky surfaces of the insulated threads closely compacted and touching on another so as to adhere closely together. Either shaft in this case can be made the driving shaft, but the screw shaft is so shown in the drawings. The layers of longitudinally and circumferentially or spirally disposed threads are alternated upon the highly-polished, metallic winding tube, commencing with the layer of longitudinally disposed threads.

To make the movements of the machine continuous and to lay alternate layers of circumferentially or spirally-wound threads at a slight angle to each other, the screw is reversed at each end of the travel of the carriage so as to wind on the return stroke, and this reversal of screw movement owing to the connecting gearing is accompanied by the reversal of the direction of rotation of the highly-polished, metallic winding tube, the effect of which action is to wind the return layer at an angle to the lower circumferential or spiral layer and hence provide a greater strength of fabric in the fire hose pipe or tubing. The reversal of movement of the screw shaft can be accomplished by means of reversing motor or as shown by reversing gears 17 and 18' and a clutch 19 may be employed for this purpose.

To permit of the automatic action of the director wheels, to wind both upon the forward and return movements of the carriage they are mounted upon the swiveled fork or forked bearing 20, which is pivoted in the carriage at 21, and placed at such angle to the highly-polished, metallic winding tube that the insulated thread passing over the guiding wheels 22 and 23 will be applied to each one in turn according as the highly-polished, metallic winding tube rotates in one direction or the other.

The fork 20 and wheels 22 and 23 are made to apply a pressure to the thread as it is laid to make the threads in one layer adhere to the threads in the layer below by means of springs 24 upon the carriage and a cross-bar 25 upon the screw-threaded extremity 26 of the swiveled fork. The guide wheel 22 is also shown mounted upon a swiveled fork F and the insulated cord passes through a central opening G in line with the groove of the wheel 23 which permits of free action of the wheel 22 without removing the insulated thread from the wheel 23.

In use a layer of thin unvulcanized rubber 27 is first wrapped about the highly-polished, metallic winding tube, a narrow groove 28 at one side receiving the overlapped ends for the purpose of providing a perfectly smooth joined surface upon which to lay the first layer of longitudinal, insulated threads, which is closely compacted by means of the highly-polished, metallic pressure tubes to the inner rubber coating. This sheet S as shown in Fig. 12 is previously prepared of longitudinally disposed insulated threads by means of a device such as is disclosed in Fig. 11 where 30 is an endless carrier of the length determined for the fire hose pipe or tubing and of sufficient width to form a sheet adapted to completely envelop the highly-polished, metallic tube and the thin rubber layer wrapped thereon. A transversely moving traveling carriage 31 provided with director and guide wheels 32 and 33 lays the insulated thread upon the carrier, until the required width is obtained. The width of this sheet, comprising the longitudinal layer, will increase or vary according to the increase in diameter of the fire hose pipe or tubing, as the successive layers are placed thereon. This sheet S, of fabric comprising one layer, is then laid upon the adjustable roller table 32' located at one side of the highly-polished, metallic winding tube, and is inclined so as to permit of its ready insertion between the highly-polished, rotating metallic winding tube and one of the pivoted highly-polished, metallic pressure tubes 8, whereby it will be immediately drawn in and wrapped upon the periphery of the highly-polished, metallic winding tube 1 and the thin layer of rubber thereon, and the pressure of the highly-polished, metallic pressure tubes will force the sheet S of longitudinal insulated threads into intimate contact therewith, so that the layers will adhere together. As soon as the first layer of longitudinal insulated threads is applied, as above described, the machine after being put in action is ready to automatically place the insulated threads forming the circumferentially or spirally wound layer upon the highly-polished, metallic winding tube by means of one of the director wheels 16 and 17 and the carriage will travel from right to left or left to right according as the machine is set to act. When the carriage has traveled the entire length of the highly-polished, metallic winding tube, one circumferentially or spirally wound layer will be completed thereon, and immediately a second sheet S of longitudinally disposed threads is applied to the first layer of circumferentially or spirally disposed insulated threads. As soon as this is accomplished, the carriage will then travel back to its original starting point, and simultaneously the second director wheel will take up and apply the insulated threads upon the second longitudinal layer at the reverse angle to the first circumferential or spiral layer, and the highly-polished metallic pressure tubes will compact the layers closely together.

In detail, as soon as one circumferential or spiral layer of insulated threads is completed another sheet or layer of longitudinally disposed insulated threads is fed between the highly-polished, metallic tubes and is applied thereon in the manner previously described, and another layer of circumferentially or spirally wound insulated threads is applied in a reverse direction to the first wound layer as the motion of the screw is reversed. This action is continued with constant reversal of the screw, and the addition of alternating layers of circumferential or spiral and longitudinal insulated threads, until the fabric is completed. When the fire hose pipe or tubing, thus formed, is completed, it is vulcanized in its place by means of steam heat admitted through the steam pipes 13 which enter both the highly-polished metallic winding tube and the highly-polished metallic pressure tubes. The heat thus applied, is retained for the purpose of vulcanization by a prepared fibrous asbestos covering P, which is placed upon the completed fire hose pipe or tubing before the steam heat is admitted through the steam pipes for the purpose of vulcanization. This prepared covering is permanently retained for the purpose of making the fire hose pipe or tubing impervious to water or moisture when completed and in use.

In order to facilitate the removal of the vulcanized fire hose pipe or tubing from the highly-polished, metallic winding tube, it is first detached by means of an air blast driven through the tube 41 and diverging openings 42 in the head of the highly-polished, metallic winding tube. An annular groove 43 in this head permits of the application of the compressed air to all points of the highly-polished, metallic winding tube surface.

To prevent the escape of the air through the head of the highly-polished, metallic winding tube furthest from the air inlet a clamp 44 is placed over the fire hose pipe or tubing at this point and a collapsible ring 45 thereunder makes an air tight fit about the fire hose pipe or tubing.

As soon as the main portion of the fire hose pipe or tubing is separated from the highly-polished, metallic winding tube and the highly-polished, metallic winding tube has been removed and lies upon the concave rollers 47, the clamp is loosened, and the small portion of the fire hose pipe or tubing secured thereby to the head 5' is readily loosened.

To remove the highly-polished, metallic winding tube, its outer bearing 45 is removed by taking away the clamps 46 which hold it in place and the highly-polished, metallic winding tube is drawn out upon the concave rollers 47 as shown in dotted lines in Fig. 2.

Having described the invention what we claim as new and desire to secure by Letters Patent is:

1. In an automatic machine for winding fire hose pipe and analogous tubing with an insulated thread for the purpose described, in combination with a highly-polished, rotatable, metallic winding tube, pivotal supports therefor upon which said highly-polished, metallic winding tube is designed to rotate, a traveling carriage and director wheel thereon, designed to traverse the entire length of the highly-polished, metallic winding tube, an operating screw passing through said carriage, gearing connecting the movements of said highly-polished, metallic winding tube and screw whereby the speed of the carriage will be correlative to the speed of rotation of the highly-polished, metallic winding tube to wind a circumferential or spiral turn thereon at each rotation of the tube, substantially as described.

2. In an automatic machine for winding a circumferential or spiral layer of threads insulated with a rubber or other adhesive material in combination with a highly-polished, rotatable metallic winding tube, a carriage adapted to travel longitudinally thereof, guide and director wheels for the insulated thread thereon, a screw passing through said carriage and adapted to move the same longitudinally of the highly-polished, metallic winding tube, gearing connecting the screw and highly-polished, metallic winding tube whereby their movements are correlative to advance the carriage at each revolution of the highly-polished, metallic winding tube and highly-polished metallic pressure tubes adapted to engage said highly-polished, metallic winding tube and a removable outer bearing for said highly-polished, metallic winding tube, substantially as described.

3. In an automatic machine for the purpose described, a rotatable highly-polished, metallic winding tube closed at both ends, fixed bearings for one end of said highly-polished, metallic winding tube, a removable bearing for the other end of said highly-polished, metallic winding tube, a screw extending the length of the highly-polished, metallic winding tube, a traveling carriage thereon, director and guide wheels mounted in the said carriage, gearing connecting the said screw and highly-polished, metallic winding tube whereby their movements are correlative, fixed bearings for the screw, means for reversing the movements of the screw at each end of its stroke, highly-polished, metallic pressure tubes adapted to engage said highly-polished, metallic winding tube and exert a pressure upon the surface thereof and spring pressed pivotal bearings for said highly-polished, metallic pressure tubes, substantially as described.

4. In a machine for the purpose described, a highly-polished, metallic winding tube closed at both ends, a steam pipe entering one end thereof, a pipe for compressed air traversing said tube, diverging passages and an annular groove connected with said radial passages at one end thereof, fixed bearings for one end of said highly-polished, metallic tube and a removable bearing for the other end thereof, substantially as described.

5. In a machine for the purpose described, a highly-polished, metallic winding tube closed at both ends, fixed bearings for one end of the highly-polished metallic winding tube, a removable bearing for the other end thereof, a steam pipe with swivel steam joint connected with the free end of said highly-polished, metallic winding tube and pressure tubes adapted to engage said highly-polished, metallic tubes, steam pipes connected with the openings in said highly-polished, metallic tubes, spring pressed bearings for said highly-polished, metallic pressure tubes and a rotating means for said highly-polished, metallic tubes, substantially as described.

6. In a machine for the purpose set forth or analogous purposes, a highly-polished, rotatable, metallic winding tube, closed at both ends, fixed bearings therefor at one end and a removable bearing at the other end, highly-polished, metallic pressure tubes engaging the surface of said highly-polished, metallic winding tube, means for supplying a vulcanizing heat to said highly-polished, metallic tube or tubes, spring pressed bearings for said highly-polished, metallic pressure tubes, a traveling carriage adapted to move longitudinally of said highly-polished, metallic winding tube, guide and director wheels therein, springs for giving pressure to said director wheels, a screw passing through said carriage and means for correlating the movements of said screw and highly-polished, metallic winding tube, substantially as described.

7. In a device for applying insulated thread under pressure to a rotating highly-polished, metallic winding tube, in combination with said highly-polished, metallic winding tube, a longitudinal screw having a correlative movement with said highly-polished, metallic winding tube, a reversing means therefor, a carriage thereon, guide wheels for said insulated thread pivoted upon said carriage, a spring pressed fork swiveled in said carriage and a director wheel at each end of said fork, said director wheels so located as to alternately receive and direct the thread to the surface of the rotating, highly-polished, metallic winding tube as the carriage travels backwards and forwards on the said screw, substantially as described.

8. The combination with a reversible traveling carriage, of insulated thread guiding wheels pivoted thereon, a fork swiveled in said carriage, pressure springs therefor, a pair of director wheels in said fork, said director wheels being so located as to alternately receive the insulated thread from said guide wheels as the movements of said carriage are reversed, substantially as described.

9. In a machine for the purpose of laying layers of alternating longitudinally, transversely, circumferentially or spirally disposed insulated threads upon a rotating, highly-polished, metallic winding tube to form a fire hose pipe or tubing, the combination with the highly-polished, metallic winding tube, of highly-polished, metallic pressure tubes engaging the entire surface thereof, a traveling carriage and insulated thread guiding and directing wheels thereon, an operating screw therefor, connecting gears therefor, and an inclined adjustable table arranged at one side of the highly-polished, metallic winding tube and pressure tubes and provided with highly-polished, metallic rollers upon which the sheet comprising the longitudinally disposed layer of insulated threads is placed before applying the same upon the transversely, circumferentially or spirally disposed layer upon the highly-polished, metallic winding tube, substantially as described.

10. In a machine for the purpose described, a highly polished metallic winding tube, spring pressed polished metallic rollers having their axes parallel with the axis of said winding tube, a rotatable head to which said winding tube is removably secured, the said head being provided with circulating air passages, instrumentalities for building up a thread fabric upon said winding tube, the said spring pressed polished metallic rollers being adapted to receive and support the finished fabric upon the withdrawal of the said highly polished metallic winding tube therefrom.

11. In a machine for winding a layer of threads coated with a tenacious compressible substance, under elastic pressure, a rotatable member upon which the threads are laid, a feed screw parallel therewith, a movable carriage thereon, and a spring pressed director wheel mounted thereon over which each thread is applied to said rotatable member, and a guide wheel adapted to travel with said carriage, substantially as described.

In testimony whereof we hereunto set our hands this 19th day of January, 1907, at Cleveland, Ohio.

EUGENE D. C. BAYNE.
LAWRENCE A. SUBERS.

In presence of—
A. T. OSBORN,
Z. B. SAWYER.